(No Model.) 2 Sheets—Sheet 2.
S. F. ROLSTON.
OPENING AND CLOSING DEVICE FOR GATES.
No. 460,598. Patented Oct. 6, 1891.
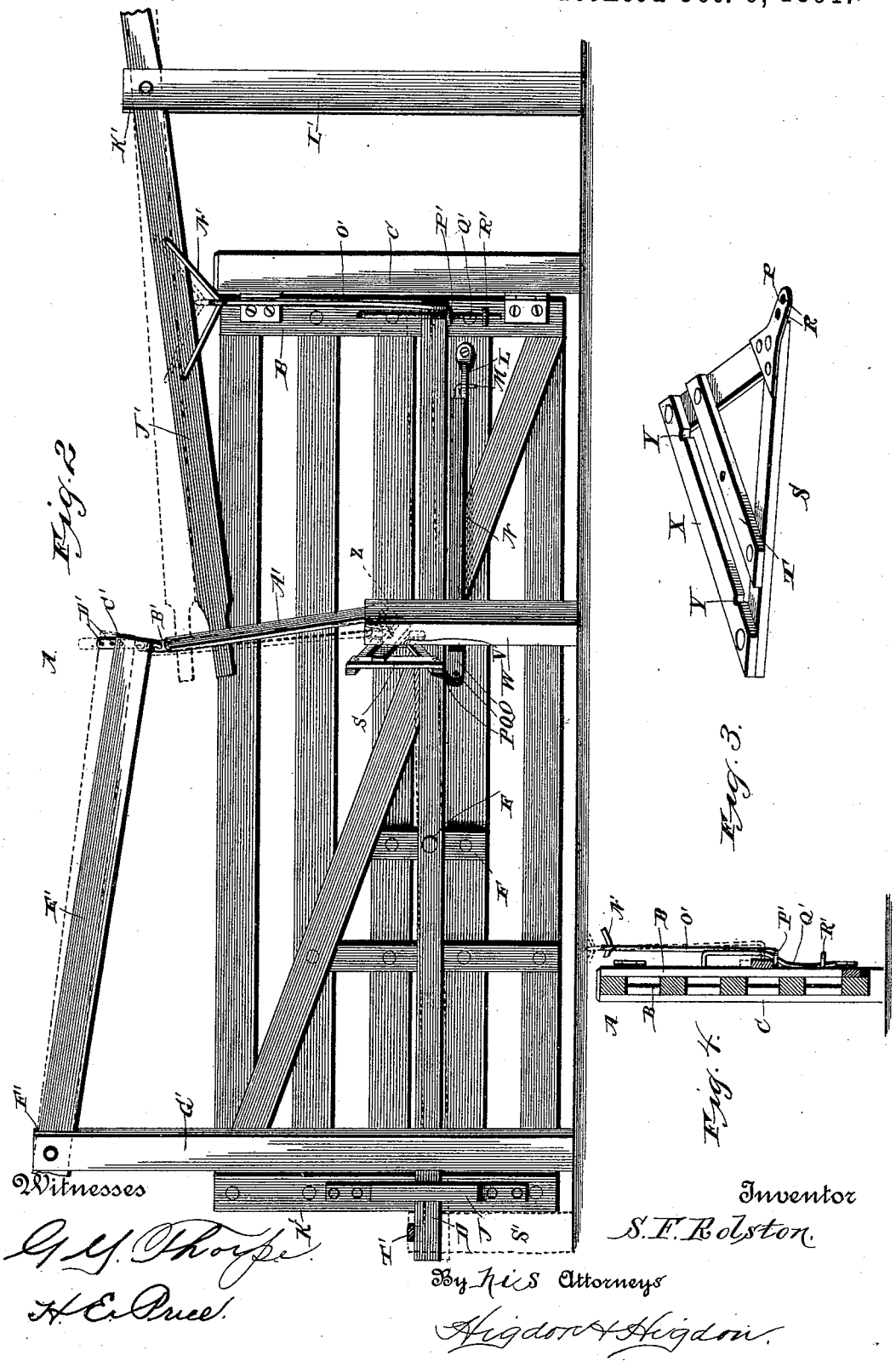
Witnesses
G. M. Thorpe
H. E. Price
Inventor
S. F. Rolston
By his Attorneys
Higdon & Higdon

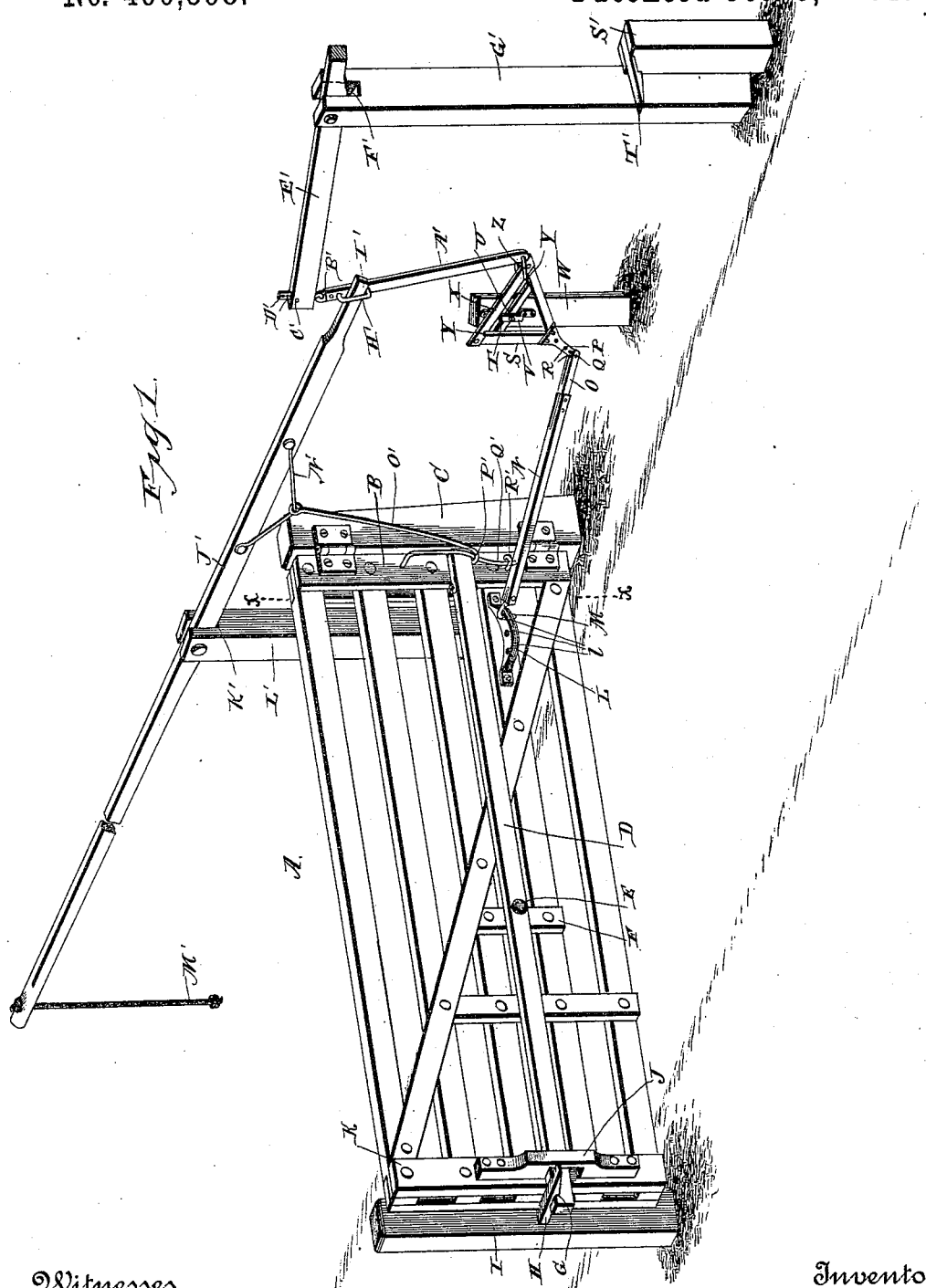

UNITED STATES PATENT OFFICE.

SAMUEL F. ROLSTON, OF EDGERTON, MISSOURI.

OPENING AND CLOSING DEVICE FOR GATES.

SPECIFICATION forming part of Letters Patent No. 460,598, dated October 6, 1891.

Application filed February 9, 1891. Serial No. 380,764. (No model.)

*To all whom it may concern:*

Be it known that I, SAMUEL F. ROLSTON, of Edgerton, Platte county, Missouri, have invented certain new and useful Improvements in Opening and Closing Devices for Gates, of which the following is a full, clear, and exact description, reference being had to the accompanying drawings, forming a part hereof.

My invention relates to swinging gates for farms, residences, and various other localities; and the objects of my invention are to produce a simple, durable, and comparatively inexpensive operating mechanism which shall be applicable to swinging gates of numerous types, and by means of which the gate can be opened from either side by the user while seated in a vehicle, thus rendering it unnecessary for the user to descend to the ground, open the gate, and return to close the gate after the vehicle has passed through the latter.

A further object of my invention is to produce an operating mechanism for swinging gates which shall automatically unlatch the gate open the same, and retain it in open position as long as desired, and which will readily close it when desired.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of a swinging gate provided with my improved operating mechanism, the gate being in closed position. Fig. 2 is a side elevation of the same, the gate being in open position. Fig. 3 is a detached perspective view of the triangular frame which is connected to the opening-bar of the mechanism. Fig. 4 is a transverse vertical section of the gate on the line *x x* of Fig. 1, showing certain of the operative parts carried by the gate.

In the said drawings, A designates the gate, which may be of any suitable or preferred form and construction, but which is shown as of oblong rectangular form and as placed horizontally between two posts C and I, said gate being hinged to the post C and closing against the opposite post I. The gate is also shown as provided with an elongated latch-bar D, extending horizontally from one end of the gate to the other, and pivoted at E to a vertical supporting-piece F, secured to the gate. The outer end of this latch-bar extends somewhat beyond the outer end of the gate and engages at said outer end beneath a suitable catch-bar or keeper H, extending horizontally outward from the post I at the outer end of the gate. The outer portion of the latch-bar D is also shown as working within a vertical guide J, secured to the end portion K of the gate.

At one side of the gate, in line with the post C thereof, is placed a suitable upright or standard L', upon the upper part of which is pivoted at K' a long lever J', which thus extends outwardly from each side of the standard and transversely across the gate.

O' designates a rod or bar which extends downward from one arm of the lever J', the upper end of said rod or bar being connected to the arm of the lever in any suitable manner and being shown as connected to a V-shaped hanger N', the ends of which are connected directly to the arm of the lever. At its lower end this rod or bar O' is curved to surround loosely a vertical guide Q', which is secured to one side of the inner part of the gate and which extends immediately beneath and in contact with the under side of the inner end of the latch-bar D. The outer extremity of this arm of the lever J' extends into a loop H', which is secured to the upper part of a link or connecting-bar A'. The upper end of the link or connecting-bar A' is adjustably secured to the outer end of a lever E', which is pivoted, as at F', in the upper end of a vertical standard G', the said standard being located in alignment with the post C of the gate and at some distance from said post. The connection of the upper end of the link or connecting-bar A' with the lever E' is in the form of a plate D', which is provided with a number of holes disposed longitudinally of the plate, the said plate being embraced by the bifurcated end of the lever and retained therein by a pin C', which passes transversely through the end of the lever and also through one or the other of the holes in the plate D'. The lower end of this link or connecting-rod A' is provided with a loop Z, which embraces one bar X of a triangular frame S. This frame is pivoted centrally in a support V, which is secured to one side of a short standard W, interposed between the post C and the standard G′, before referred to, a suitable pin U serving as the pivotal connection of the frame S with the standard W. At its opposite ends, on the inner side thereof, the arm or bar X of the triangular frame is formed with two notches or recesses Y, into which the link or loop Z alternately catches as the gate mechanism is operated. To the remaining angle of this triangular frame is secured a plate P, the extended arm of which is formed with any desired number of holes or eyes R. One end of a connecting link or bar N is secured adjustably to the plate P by a pin or bolt Q, which passes transversely through the end of the bar and also into one or the other of the holes R. The opposite end of the bar N is provided with a hook M, which is engaged in one or another of a number of holes $l$, which are formed in a plate L, secured horizontally upon the side of the gate near its inner end. S′ designates a short standard which is placed vertically beyond and in line with the standard G′, and upon the upper end of which is placed a hook-shaped catch T′. The opposite end of the lever J′ from that which is connected to the link or connecting-bar A′ is provided with a rope or other pendant which facilitates the tilting of the lever, and the outer end of the lever E′ is assumed to be provided with a similar connection.

From the above description it will be seen that as a person seated upon a vehicle or mounted on horseback approaches the gate from either side he grasps one of the pendants M and depresses the outer ends of the levers J′ E′ and correspondingly elevates their inner ends. This movement elevates the link A′ and oscillates the triangular frame X in such a direction that its plate P moves away from the gate. The elevation of the inner end of the lever J′ causes the bar O′ to depress the free end of the latch-bar, while the movement of the triangular frame X draws the link or bar N longitudinally and thus opens the gate. The gate either swings into closed position by gravity or is swung into such position by pushing upward upon the outer end of the opposite end of the lever J′ or E′, according as the user is passing through the gate toward one or the other of said levers.

Having thus described my invention, what I claim as new therein, and desire to secure by Letters Patent, is—

1. An improved mechanism for operating swinging gates, comprising a pair of tilting levers mounted upon standards located at opposite sides of the gate, an oscillating frame mounted upon a standard located between the two first-named standards and at one side of the gate, a link connecting one end of one of the levers with the oscillating frame and connected to the adjacent end of the companion lever, a link connected at one end to the said frame and at the opposite end to the gate, and a bar or rod connected at one end to one of the levers and extending at its opposite end beneath the lower side of the gate-latch, substantially as set forth.

2. An improved mechanism for operating swinging gates, comprising a suitable gate having a pivoted latch-bar extending horizontally throughout its length, a pair of standards located at opposite sides of the gate and carrying each a pivoted lever at its upper end, a third standard located between the two first-named standards, an oscillating triangular frame mounted upon said standard, a link adjustably connected at one end to one end of one of the levers, a loop connected to the lower end of the link and embracing one bar of the oscillating frame so as to slide thereon, a second link adjustably connected at one end to one angle of the oscillating frame and adjustably connected at its opposite end to the gate, a rod or bar connected at one end to one of the levers and embracing at its lower end a guide upon the gate and engaging at said end beneath the latch-bar, and a standard carrying a catch to retain the gate in open position, substantially as set forth.

In testimony whereof I affix my signature in presence of two witnesses.

SAMUEL F. ROLSTON.

Witnesses:
 R. S. NUNNELLEY,
 L. E. GUNN.